United States Patent [19]

Artman et al.

[11] Patent Number: 4,994,231

[45] Date of Patent: Feb. 19, 1991

[54] APPARATUS FOR BLENDING CONSTITUENTS OF VARYING DENSITIES

[75] Inventors: Thomas A. Artman, Lynchburg; Carroll E. Allcock, Rustburg; Garry L. Garner, Forest; Gary L. Jones, Lynchburg, all of Va.; William R. Larsen, Sterling, Ill.; Steven N. Zartman, Lynchburg, Va.

[73] Assignee: The Babcock & Wilcox Company, New Orleans, La.

[21] Appl. No.: 497,173

[22] Filed: Mar. 22, 1990

[51] Int. Cl.⁵ .............................................. G21C 19/00
[52] U.S. Cl. .................................. 376/261; 376/268; 376/901; 222/145; 222/142.5; 366/220
[58] Field of Search ............... 376/261, 268, 409, 901; 141/105, 106, 107; 366/154, 181, 220, 232; 222/145, 142.5

[56] References Cited

U.S. PATENT DOCUMENTS

| | | | |
|---|---|---|---|
| 3,572,405 | 3/1971 | Mattson, Jr. et al. | 141/105 |
| 3,901,409 | 8/1975 | Bradley et al. | 141/105 |
| 3,926,344 | 12/1975 | Bradley et al. | 222/145 |
| 4,495,145 | 1/1985 | Gheri | 376/261 |
| 4,495,146 | 1/1985 | Gheri | 376/261 |

Primary Examiner—Brooks H. Hunt
Assistant Examiner—Meena Chelliah
Attorney, Agent, or Firm—Robert J. Edwards; Michael L. Hoelter

[57] ABSTRACT

A blending/loading system wherein an elongated cylinder or fuel rod is positioned on a turntable underneath a series of hoppers containing the particulates to be blended/loaded. Separate transfer tubes from each hopper are aligned with the cylinder and are subsequently lowered into the cylinder. Upon lowering, the cylinder is rotated and nozzles at the ends of the transfer tubes are activated to discharge, disperse and mix the stored particulates into the rotating cylinder. As the cylinder fills up, the transfer tubes are withdrawn from the rotating cylinder until the desired amount of fill is reached. Afterwards, the nozzles block any additional flow from occurring as they are raised out of the cylinder.

12 Claims, 3 Drawing Sheets

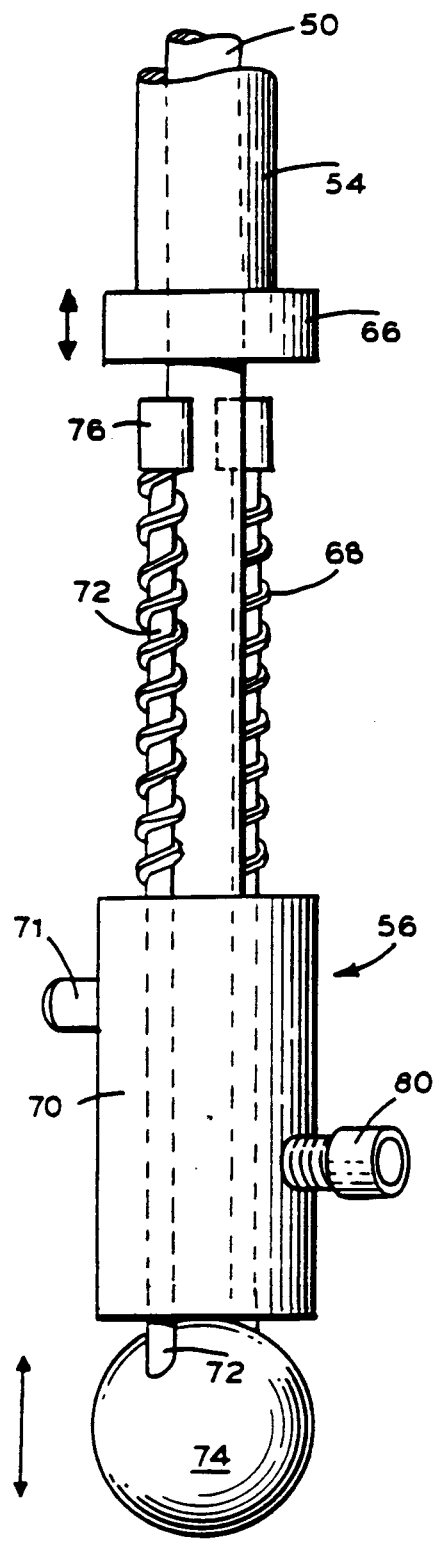
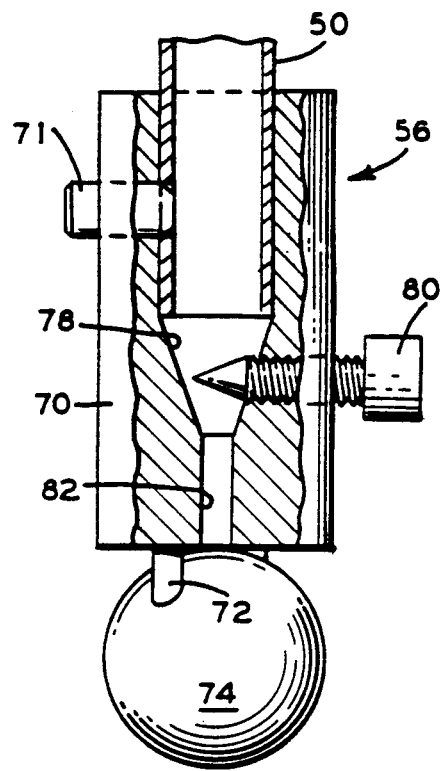
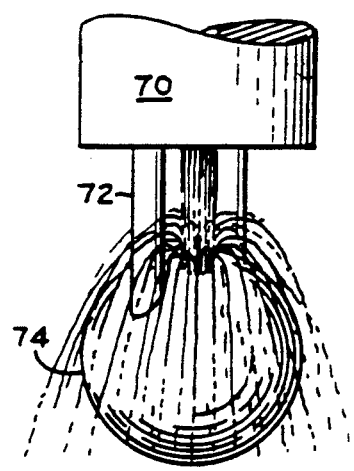

4,994,231

APPARATUS FOR BLENDING CONSTITUENTS OF VARYING DENSITIES

FIELD OF THE INVENTION

This invention relates to the art of blending powders and granulates of varying densities and more particularity to the loading of nuclear fuel rods with uniform diameter nuclear fuel.

BACKGROUND OF THE INVENTION

Today there exist various devices for blending powders and granulates of comparable densities. Commercially available devices are the V-blender, turbula shaker-mixer, and the motionless blender. U.S. Pat. Nos. 4,495,145 and 4,495,146 to Gehri disclose additional systems for blending materials having the same density but different diameters.

In the alternative, blending material with varying density but having the same diameter is not so easily accomplished. This is because achieving a homogeneous blend and transferring the blend to its final destination present unique problems that must be resolved. These factors gain increased significance whenever the blended material is nuclear fuel.

It is thus an object of this invention to provide a blending apparatus for constituents that will provide a homogeneous blend. A further object of this invention is to provide such a homogeneous blend for constituents of varying density but having a uniform diameter. Another object of this invention is to provide control over the blending ratio of the different fuels involved should such be desired. These and other objects of this invention will become obvious upon further investigation.

SUMMARY OF THE INVENTION

This invention pertains to a blending system that homogeneously loads constituents of varying densities into a vertically oriented cylinder. This cylinder is initially secured to a turntable afterwhich a plurality of transfer conduit, each originating from separate overhead hoppers, are lowered into the cylinder through a top opening. A nozzle secured to each transfer conduit is then operated while the cylinder is rotated. Consequently, the constituents from each hopper are simultaneously discharged and uniformly distributed into the cylinder. During such discharge, the transfer conduit is raised as the now rotating cylinder is filled thereby maintaining a predetermined dispersion path until the required amount of fill is reached.

BRIEF DESCRIPTION OF THE DRAWINGS

FIG. 4 is an enlarged view of the dispersing nozzle apparatus.
FIG. 5 is an enlarged view, partially broken away, of the nozzle.
FIG. 6 is an enlarged view, partially broken away, of the nozzle in operation.

DETAILED DESCRIPTION OF THE DRAWINGS

Figure 1:
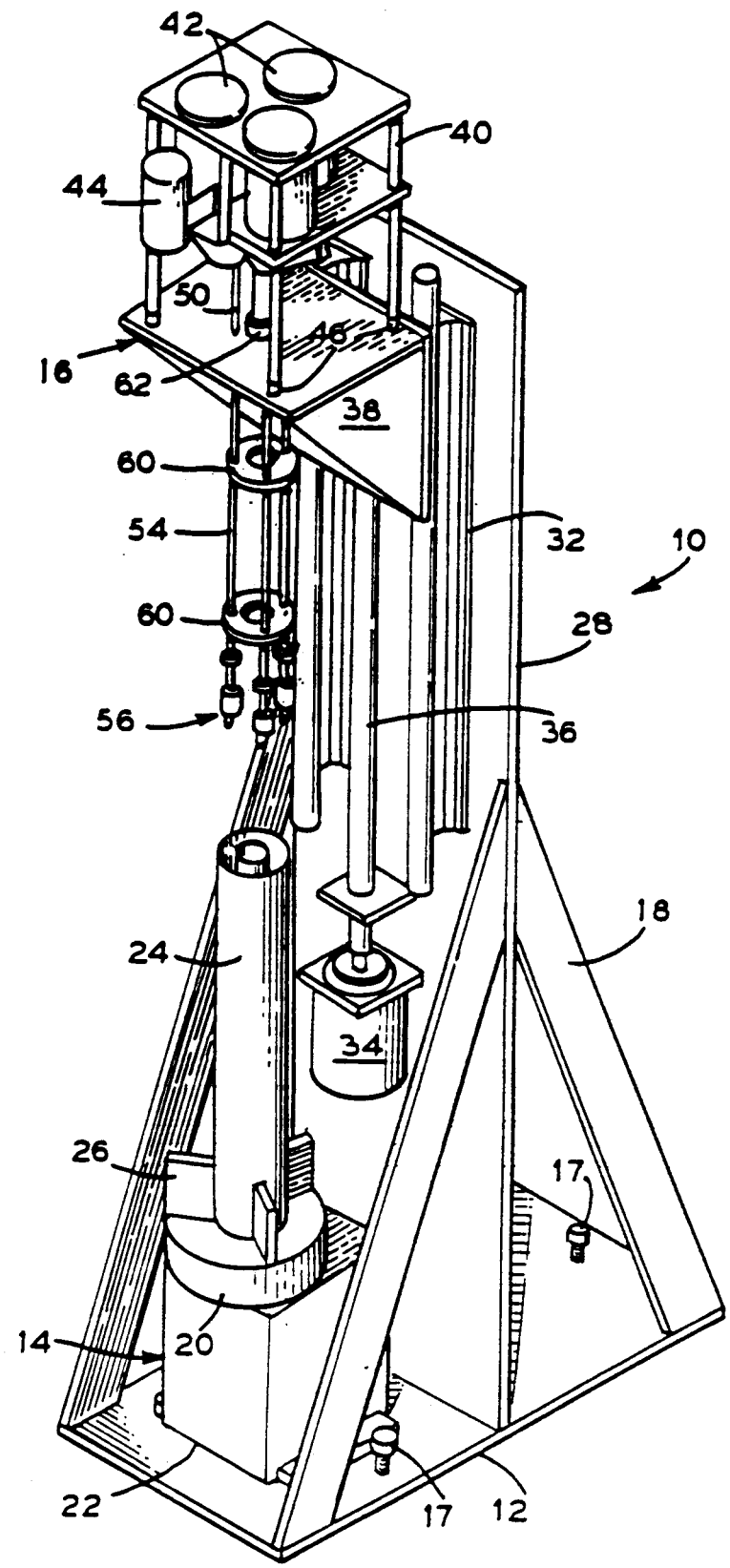
FIG. 1 is a pictorial view of the invention.

Acknowledging that many different embodiments and/or variations of this invention exist, the preferred embodiment at the present time is disclosed herein. Referring initially to FIG. 1, there is shown blending system 10 comprising inverted T-frame 12, turntable assembly 14 and loading assembly 16. T-frame 12 is supported on the floor by three leveling screws to level the top of loading assembly 16. Bracing 18 is utilized to make T-frame 12 a rigid structure.

Secured to the base of T-frame 12 is turntable assembly 14. Assembly 14 comprises turntable 20 that is powered by motor 22 in order to rotate blend container 24 around a vertical axis. The top of turntable 20 is configured with three self-centering jaws 26 that align and support container 24 while it is being rotated about its longitudinal axis. These jaws 26 also prevent container 24 from sliding off turntable 20 during its rotation.

Above turntable assembly 14 is loading assembly 16 secured to upright member 28 of inverted T-frame 12. Loading assembly 16 is vertically movable along two parallel slide rails 32 which are affixed to upright member 28. Motor 34, also secured to upright member 28, is sized to move loading assembly 16 along rails 32 via ball screw 36. Other configurations are equally applicable so long as the change in elevation of loading assembly 16 with respect to turntable assembly 14 is controllable.

Platform 38, which is moved along rails 32, supports frame 40 directly above blend container 24. Frame 40 is configured in this embodiment to support three hoppers 42, each separately containing the different materials to be blended and loaded. It should be acknowledged that more or fewer hoppers can also be accommodated. To aid in the uniform flow of the different constituents from hoppers 42, a vibrator 44 is attached to frame 40 to impart a horizontal vibration to frame 40 and hence hoppers 42. Rubber isolators 46 are used to secure frame 40 to platform 38 in an effort to reduce the effect of vibrator 44 on the other components of blending system 10.

Figure 2:
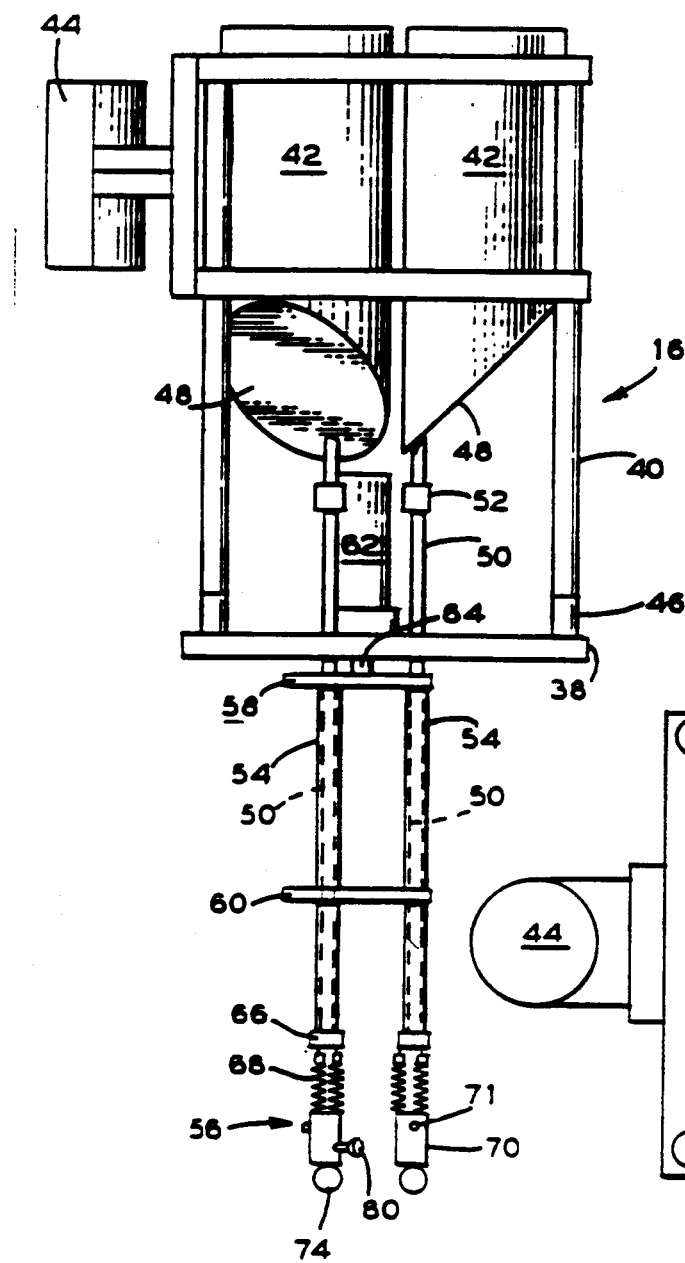
FIG. 2 is a side view of the loading assembly.
Figure 3:
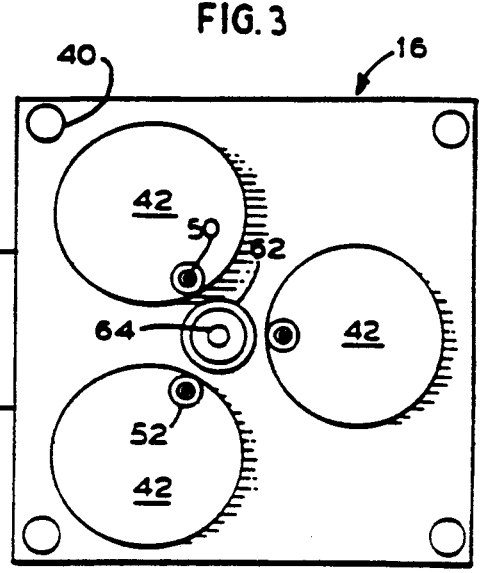
FIG. 3 is a top view, partially broken away of the loading assembly.

As seen in better detail in FIGS. 2 and 3, each of hoppers 42 are identically configured so as to contain similar amounts of similarly sized particles even though the particles will be of different densities. However, it should be noted that under normal circumstances, just as the density of the collected particles may vary, so may their size and the size of hoppers 42. In this embodiment, however, hoppers 42 have a uniform diameter of about 2.5 inches and a height of about 8 inches and hold about 500 cc of a particular constituent. Also, each hopper 42 has a sloping bottom wall 48 that funnels the particles to transfer tube 50. Each transfer tube 50 extends downward from its respective hopper 42 with connector 52 coupling additional lengths of transfer tube 50 as needed. These transfer tubes 50 all run parallel to slide rails 32 and they are equally spaced to each other so that they may all be lowered into blend container 24. As shown, each transfer tube 50 extends through platform 38 and continues downward through sleeve or push tube 54 before terminating in nozzle 56. Push tubes 54 which are rigidly secured to circular plate 58 and rings 60, maintain the vertical alignment of the three illustrated (more or less may actually be incorporated) transfer tubes 50.

Additionally, push tubes 54 and circular plate 58 are utilized to activate nozzles 56. This is accomplished via air cylinder 62 secured to platform 38 that connects to one end of push rod 64. The other end of push rod 64 (on the opposite side of platform 38) connects to circular plate 58 secured to each of push tubes 54. Consequently, air cylinder 62 and push rod 64 support or suspend push tubes 54, circular plate 58 and rings 60 underneath platform 38. In this fashion, as air cylinder 62 is operated to extend push rod 64, the push tube-circular plate-ring assembly is moved downward with respect to transfer tubes 50. This causes contact collar 66 (on the opposite end of each push tube 54) to compress springs 68 thereby opening nozzle 56.

Referring now to FIG. 4, nozzle 56 is shown as comprising a thick-walled cylinder 70 secured to the end of each transfer tube 50 via set screw 71. Ball support rods 72 extend through the walls of cylinder 70 and are allowed to slide therein. Ball support rods 72 are secured to ball 74 as shown which is sized to achieve the desired dispersion and to block or seal off the lower opening of cylinder 70 thereby also blocking the flow through its respective transfer tube 50. Each spring 68 raises the opposite end, end 76, of ball support rod 72 away from nozzle 56 until no further upward movement is permitted because of ball 74 engaging the lower end of nozzle 56. This arrangement causes ball 74 to always remain in the closed or sealed position until the force of springs 68 is overcome.

Referring now to FIG. 5, the converging flow path within nozzle 56 is illustrated. Transfer tube 50, which is secured to cylinder 70 via set screw 71, terminates above conical section 78. Flow regulator 80 is threaded into conical section 78 as a means to control or regulate the flow out of nozzle 56 via exit channel 82. As shown, ball 74 is sized to achieve the desired dispersion pattern and to normally block exit channel 82.

During operation of the above described embodiment, platform 38 is moved to the top of rails 32 via motor 34. Once sufficient clearance is achieved, blend container 24 is placed between jaws 26 on turntable 20. Platform 38 would then be lowered so that nozzles 56 are initially positioned near the bottom within container 24. Alternative, nozzles 56 would discharge into a continuation of transfer tubes 50 which is sized to extend into container 24. In any event, however, before beginning the discharge operation, flow regulator 80 of each nozzle 56 is adjusted to achieve a predetermined flow rate which will result in a homogeneous blend of the desired consistency or ratio.

Once nozzles 56 are lowered within container 24, motor 22 is activated to rotate turntable 20 and hence container 24, however, it should be noted that this rotational speed is not sufficient enough to induce radial movement of the particles. Subsequently, air cylinder 62 is operated to lower push rod 64 causing contact collar 66 to engage end 76 of each ball support rod 72 thereby moving them against the force of springs 68. As ball support rods 72 are depressed, ball 74 is moved away from exit channel 82 thereby allowing particles to flow into container 24. Additionally, dual purpose ball 74 distributes the material in an umbrella-like fashion resulting in a homogenously loaded bed. As discussed earlier, vibrator 44 is activated to aid in the flow of the particles from hoppers 42 through transfer tubes 50.

Concurrently with the rotation of blend container 24 and the discharge of the contents of hoppers 42 into container 24, platform 38 continuously moves upward as container 24 becomes filled. This upward movement, in conjunction with the rotation of container 24, causes nozzles 56 to discharge their contents in an even, controlled and spiraled manner thus imparting a homogeneous blend to container 24. Additionally, the dispersing of the constituents amongst themselves, caused by the constituents deflecting off the curved surface (i.e. ball 74) induces an even greater homogenous blend.

Once the desired depth of blend is achieved, air cylinder 62 retracts push rod 64 thereby releasing springs 68 which once again cause ball 74 to block exit channel 82. Platform 38 is then raised as needed to provide sufficient clearance so that blend container 24 can be removed from turntable 20.

Although not illustrated here, blend container 24 may be round, square, rectangular, or any other shape so long as nozzles 56 and the configuration of transfer tubes 50 can be raised and lowered within container 24 as it is being rotated (bearing in mind that rectangular containers require a translational motion). Also, the preferred blend consists of three materials having identically sized spherical particles; but because of their compositions, the particles will probably have different densities.

This invention has particular usefulness in the nuclear power industry because it can precisely load separate radioactive particulates into a fuel rod in accordance with a preferred mix or ratio. This invention also minimizes particle degradation caused by abrasive forces between the different constituents. It also increases the particle packing fraction without the need for "binders" since blending and loading are accomplished in the same operation. Also, because the constituents are kept separate prior to blending and loading, the possibility of unwanted constituent reactivity is minimized.

What is claimed as invention is:

1. A blending system for homogeneously loading constituents of varying densities into a cylinder comprising:
   (a) a vertically elongated cylinder having a top opening;
   (b) a turntable supporting said cylinder and configured to rotate said cylinder about its vertical axis;
   (c) a plurality of hoppers supported about said top opening, each said hopper configured to store a uniform diameter constituent therein;
   (d) a transfer conduit secured to each said hopper and extending to said cylinder for separately transferring each said stored constituent to said cylinder, a lower portion of each said transfer conduit being configured to fit through said top opening and extend into said cylinder;
   (e) nozzle means secured to said transfer conduit for independently controlling the flow of each said constituent through its respective said transfer conduit and into said cylinder;
   (f) raising/lowering means for varying the elevation of at least the said lower portion of said transfer conduit with respect to said cylinder;
   (g) alignment means for vertically aligning said cylinder with respect to the said lower portion of said transfer conduit; and,
   (h) operating means for rotating said cylinder about its said vertical axis and for simultaneously raising the said lower portion of said transfer conduit while also homogeneously discharging constituents from said hoppers through said transfer conduit and into said cylinder.

2. A blending system as set forth in claim 1 further comprising vibrating means for vibrating said hoppers to aid in the transfer of said constituent from each said hopper through said transfer conduit and into said cylinder.

3. A blending system as set forth in claim 2 wherein said raising/lowering means comprise a vertically movable platform supporting said transfer conduit, the elevation of said platform, and hence said transfer conduit, being adjusted depending upon the depth of said constituents in said cylinder.

4. A blending system as set forth in claim 3 wherein said nozzle means comprise independent flow control means for adjustably controlling the flow of a said constituent from a said hopper into said cylinder.

5. A blending system as set forth in claim 4 wherein said nozzle means comprise a stop for blocking the flow of said constituents into said cylinder.

6. A blending system as set forth in claim 5 wherein said stop is normally biased in a closed position with said operating means overcoming said bias whenever flow into a said cylinder is desired.

7. A blending system as set forth in claim 6 wherein said nozzle means are secured to an end region of each said transfer conduit with said nozzle means configured to extend into said cylinder.

8. A blending system as set forth in claim 7 wherein said nozzle means comprise a converging flow path for said constituents, and said independent flow control means project into said converging flow path.

9. A blending system as set forth in claim 8 wherein said stop comprises a curved surface that is normally closed under spring force.

10. A blending system as set forth in claim 9 wherein said curved surface is configured to randomly deflect said constituents into a homogeneous mixture.

11. A blending system as set forth in claim 10 wherein there are three said hoppers and correspondingly three said transfer conduit and nozzles.

12. A blending system as set forth in claim 11 wherein said vertically elongated cylinder is a fuel rod and said constituents are spherical radioactive powder or granules of generally uniform diameter but having different densities.

* * * * *